US010158825B2

(12) United States Patent
Abou Mahmoud et al.

(10) Patent No.: US 10,158,825 B2
(45) Date of Patent: Dec. 18, 2018

(54) ADAPTING A PLAYBACK OF A RECORDING TO OPTIMIZE COMPREHENSION

(71) Applicant: INTERNATIONAL BUSINESS MACHINES CORPORATION, Armonk, NY (US)

(72) Inventors: Alaa Abou Mahmoud, Dracut, MA (US); Gregory P. Dracoulis, Boston, MA (US); Peter E. Stubbs, Georgetown, MA (US); Steven J. Ulrick, Chelmsford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 192 days.

(21) Appl. No.: 14/843,328

(22) Filed: Sep. 2, 2015

(65) Prior Publication Data
US 2017/0064244 A1 Mar. 2, 2017

(51) Int. Cl.
H04N 5/783 (2006.01)
H04N 5/76 (2006.01)
G11B 27/00 (2006.01)

(52) U.S. Cl.
CPC ........... H04N 5/783 (2013.01); G11B 27/005 (2013.01); H04N 5/7605 (2013.01)

(58) Field of Classification Search
CPC .... H04N 5/783; H04N 5/7605; G11B 15/442; G11B 15/46
USPC ........................................................ 386/344
See application file for complete search history.

(56) References Cited

U.S. PATENT DOCUMENTS

| 6,490,553 | B2 | 12/2002 | Van Thong et al. |
| 6,522,333 | B1 * | 2/2003 | Hatlelid ................... G06T 13/40 345/473 |
| 7,149,412 | B2 | 12/2006 | Blair et al. |
| 2002/0010916 | A1 * | 1/2002 | Thong ..................... H04N 5/278 725/1 |
| 2002/0082828 | A1 * | 6/2002 | Hejna, Jr. ................ G09B 5/00 704/211 |
| 2006/0123262 | A1 | 6/2006 | Bullman |
| 2007/0201817 | A1 | 8/2007 | Peker |
| 2007/0223873 | A1 * | 9/2007 | Gilbert ................... H04N 5/783 386/350 |

(Continued)

OTHER PUBLICATIONS

"Adaptive Bitrate Streaming", accessed via the Internet at <https://en.wikipedia.org/wiki/Adaptive_bitrate_streaming> as of Sep. 1, 2015, 5 pages.

(Continued)

Primary Examiner — Thai Q Tran
Assistant Examiner — Nien-Ru Yang
(74) Attorney, Agent, or Firm — Isaac J. Gooshaw; Amy J. Pattillo

(57) ABSTRACT

Each of segment of a recording is analyzed for complexity specifying a rate of speech at a normal playback speech. A target rate is selected at which to playback the recording, the target rate specifying a fastest optimal speed at which a particular user listening to the recording is able to comprehend the playback. During playback of the recording, a separate adjusted playback rate is selected for each of the segments to adjust the playback rate of speech from the rate of speech at the normal playback speed to the target rate.

20 Claims, 8 Drawing Sheets

(56) References Cited

U.S. PATENT DOCUMENTS

2007/0250311 A1* 10/2007 Shires .................. G10L 21/04
704/226
2008/0130923 A1* 6/2008 Freeman ................ G06F 3/167
381/303
2008/0212685 A1 9/2008 Masten

OTHER PUBLICATIONS

"Final Cut Pro 7 User Manual: About Real-Time Playback Options", accessed via the Internet at <https://documentation.apple.com/en/finalcutpro/usermanual/index.html#chapter=84%26section=3%26tasks=true> as of Sep. 1, 2015, 6 pages.

Zhao, Bin, "Quasi Real-Time Summarization for Consumer Videos", accessed via the internet at <https://www.cs.cmu.edu/%7Eepxing/papers/2014/Zhao_Xing_cvpr14a.pdf> as of Sep. 1, 2015, 8 pages.

Condliffe, Jamie, "New Software Automatically Edits Out Boring Parts of a Video," accessed via the internet at <http://gizmodo.com/new-software-automatically-edits-out-boring-parts-of-a-1596900816>, 2 pages.

* cited by examiner

ADAPTING A PLAYBACK OF A RECORDING TO OPTIMIZE COMPREHENSION

BACKGROUND

1. Technical Field

This invention relates in general to digital recording and more particularly to adapting a playback of a recording to optimize comprehension for a particular user.

2. Description of the Related Art

When playing back an audio or video recording, a user may select a playback speed that is faster than the speed at which the recording was made, to reduce the amount of time required to listen to the playback of the recording.

BRIEF SUMMARY

When a user selects to playback a recording at a faster speed than the recording speed, one or more parts of the recording may be difficult to comprehend when played at the faster playback speed. In view of the foregoing, there is a need for a method, system, and program product for adapting a playback speed of a recording to optimize comprehension for the particular user of the recording during playback.

In one embodiment, a method is directed to analyzing, by a computer, a single instance of a recording using natural language processing to translate one or more spoken words in the single instance of the recording into textual language. The method is directed to identifying, by the computer, a separate complexity of each translation of each of the one or more spoken words to reflect a rate of speech at a normal playback speed and to reflect a difficulty performing natural language processing to detect each spoken word within the single instance of the recording and translate each spoken word in the single instance of the recording into textual language, each separate complexity specifying a different speed. The method is directed to analyzing, by the computer, the single instance of a recording to identify a plurality of segments of the recording for each separate complexity, each of the plurality of segments set to a separate length for a separate continuous portion of the one or more spoken words of a same complexity. The method is directed to selecting, by the computer, a target rate at which to playback the single instance of the recording for access by a particular user from among a plurality of users, the target rate specifying a fastest optimal speed at which the particular user listening to the single instance of the recording is able to comprehend the playback. The method is directed, during playback of the single instance of the recording, modifying, by the computer, playback of the single instance of the recording in an interface accessible to the particular user to contiguously be at the target rate, wherein a separate adjusted playback rate is applied to each of the plurality of segments to adjust the playback rate of speech from the separate complexity of the rate of speech at the normal playback speed to the target rate.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to analyze a single instance of a recording using natural language processing to translate one or more spoken words in the single instance of the recording into textual language. The stored program instructions comprise program instructions to identify a separate complexity of each translation of each of the one or more spoken words to reflect a rate of speech at a normal playback speed and to reflect a difficulty performing natural language processing to detect each spoken word within the single instance of the recording and translate each spoken word in the single instance of the recording into textual language, each separate complexity specifying a different speed. The stored program instructions comprise program instructions to analyze the single instance of the recording to identify a plurality of segments of the recording for each separate complexity, each of the plurality of segments set to a separate length for a separate continuous portion of the one or more spoken words of a same complexity. The stored program instructions comprise program instructions to select a target rate at which to playback the single instance of the recording for access by a particular user from among a plurality of users, the target rate specifying a fastest optimal speed at which the particular user listening to the single instance of the recording is able to comprehend the playback. The stored program instructions comprise program instructions to, during playback of the single instance of the recording, modify playback of the single instance of the recording in an interface accessible to the particular user to contiguously be at the target rate, wherein a separate adjusted playback rate is applied to each of the plurality of segments to adjust the playback rate of speech from the separate complexity of the rate of speech at the normal playback speed to the target rate.

In another embodiment, a computer program product comprises one or more computer-readable storage devices and program instructions, stored on at least one of the one or more storage devices. The stored program instructions comprise program instructions to analyze a single instance of a recording using natural language processing to translate one or more spoken words in the single instance of the recording into textual language. The stored program instructions comprise program instructions to identify a separate complexity of each translation of each of the one or more spoken words to reflect a rate of speech at a normal playback speed and to reflect a difficulty performing natural language processing to detect each spoken word within the single instance of the recording and translate each spoken word in the single instance of the recording into textual language, each separate complexity specifying a different speed. The stored program instructions comprise program instructions to analyze the single instance of the recording to identify a plurality of segments of the recording for each separate complexity, each of the plurality of segments set to a separate length for a separate continuous portion of the one or more spoken words of a same complexity. The stored program instructions comprise program instructions to select a target rate at which to playback the single instance of the recording for access by a particular user from among a plurality of users, the target rate specifying a fastest optimal speed at which the particular user listening to the single instance of the recording is able to comprehend the playback. The stored program instructions comprise program instructions to, during playback of the single instance of the recording, modify playback of the single instance of the recording in an interface accessible to the particular user to contiguously be at the target rate, wherein a separate adjusted playback rate is applied to each of the plurality of segments to adjust the playback rate of speech from the separate complexity of the rate of speech at the normal playback speed to the target rate.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
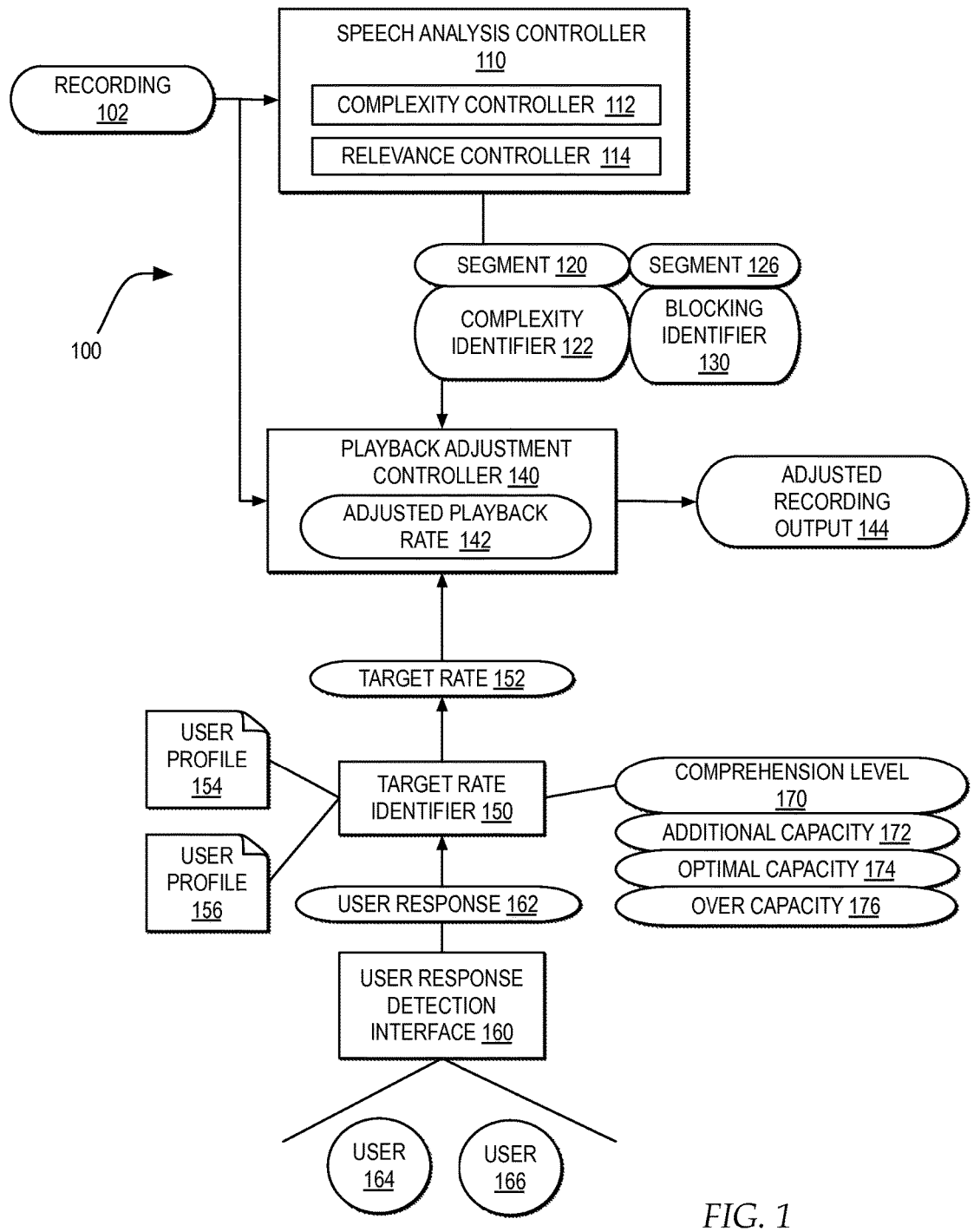
FIG. 1 is a block diagram illustrating one example of a playback system for adapting a playback of a recording to optimize comprehension for a particular user.

FIG. 1 illustrates one example of a block diagram of an playback system for adapting a playback of a recording to optimize comprehension for a particular user.

In one example, a playback system 100 includes one or more components for managing playback of a recording 102 as adjusted recording output 144.

Playback system 100 adapts a playback speed of recording 102 to optimize comprehension for one or more particular users and outputs the recording at the adapted playback speed and with only relevant sections, as adjusted recording output 144. In additional or alternate examples, playback system 100 may include additional or alternate components from the controllers and interfaces illustrated in FIG. 1.

In one example, playback system 100 may include a speech analysis controller 110 for receiving recording 102. Speech analysis controller 110 may analyze recording 102 prior to playback of recording 102 or in real-time as playback is occurring.

In one example, speech analysis controller 110 may implement a complexity controller 112 for analyzing recording 102 and for calculating one or more complexity characteristics of recording 102. In one example, complexity controller 112 may implement one or more types of speech recognition to analyze recording 102 and calculate a complexity characteristic of a rate of speech within recording 102 at a normal playback speed. In another example, complexity controller 112 may implement one or more types of natural language processing controllers enabled to analyze recording 102 and calculate a complexity characteristic identifying a language being spoken and a difficulty of processing the speech.

In addition, speech analysis controller 110 may implement a relevance controller 114 for analyzing recording 102 and calculating one or more portions of recording 102 that are not relevant. In one example, relevance controller 114 may detect portions of recording 102 that are not relevant by detecting portions of recording 102 that do not include any speech. In one example, portions of recording 102 that do not include any speech may be identified from portions where a recording starts before the speaker starts speaking, technical difficulties with equipment that lead to recordings not including speech, or long pauses in speech. In one example, relevance controller 114 may detect portions of recording 102 that are not relevant by buffering a selection of frames, calculating an audio energy content per frame, marking frames for possible deletion based on the relative energy content, performing further analysis of the energy content of the frames in relation to other frames, and marking those frames with low energy content as irrelevant. In another example, relevance controller 114 may also detect portions of recordings that are not relevant by detecting portions of recording 102 that are not relevant to a topic selected by a user. In one example, relevance controller 114 may perform a natural language analysis of recording 102 to translate recording language into textual language, analyze the textual language to determine relevance to a particular topic selected by a user, and mark those frames with language that is not relevant to the particular topic as not relevant. In additional or alternate examples, relevance controller 114 may implement additional or alternate methods of identify and mark portions of recording 102 that are not relevant.

In one example, speech analysis controller 110 may select to segment recording 102 into one or more segments, where each segment may identify a separate complexity identifier, if complexity controller 112 detects one or more complexity identifiers for a continuous portion of the recording, and may include a separate block identifier, if relevance controller 114 identifies a continuous portion of the recording as not relevant. In one example, speech analysis controller 110 may identify a segment 120 from recording 120, with a complexity identifier 122, and a segment 126 from recording 120, with a blocking identifier 130. In additional or alternate examples, speech analysis controller 110 may identify additional segments within recording 102. In addition, in additional or alternate examples, speech analysis controller 110 may identify a complexity identifier and a blocking identifier for a same segment of recording 102. In one example, each of the segments of a recording may be different lengths or set to a same length.

In one example, playback system 100 may include a playback adjustment controller 140. In one example, playback adjustment controller 140 controls playback of recording 102. In one example, playback adjustment controller 140 may receive recording 102 from speech analysis controller 110 or may receive recording 102 directly, and adjust playback of recording 102 according to inputs from speech analysis controller 110.

In one example, playback adjustment controller 140 may adjust playback of one or more segments of recording 102 marked with a block identifier, such as segment 126 with blocking identifier 130, to skip replaying the segment marked with the block identifier. In one example, playback adjustment controller 140 may adjust playback of one or more segments of recording 102 marked with a complexity identifier, such as segment 120 with complexity identifier 122, to replay the segment at an adjusted playback rate 142 calculated for the segment to optimize comprehension during playback for one or more users, such as a user 164.

In one example, for each segment, playback adjustment controller 140 may adjust a playback rate for the segment at adjusted playback rate 142 to meet a target rate 152. In one example, target rate 152 is selected as a target playback rate for optimizing comprehension by one or more particular users during playback of a recording. In one example, playback adjustment controller 140 may determine a rate of speech of segment 120 from complexity identifier 122 and adjust the playback of segment 120, to meet target rate 152, from the rate of speech of the segment at a normal rate to an adjusted playback rate 142.

In one example, a target rate identifier 150 may dynamically select target rate 152 for one or more particular users according to settings in one or more user profiles associated with the one or more particular user. In one example, the listeners to recording 102 may include one or more users, such as a user 164 and a user 166. In one example, target rate identifier 150 may access one or more user profiles, such as a user profile 154, that may be associated with user 164, and a user profile 156, that may be associated with user 166. In one example, each of user profile 154 and user profile 156 may include listening history and selections for a particular user that enable target rate identifier 150 to specify target rate 152 to optimize comprehension of recording 102 during playback for the user associated with the user profile. For example, a user profile may include a listening history and selections that indicates a user's capacity for listening to a recording, such as a maximum word per minute rate that the user has selected or is indicated in the listening history for the user and an average word per minute rate that the user has selected or is indicated in the listening history for the user. For example, a user profile may further specify the user's maximum and average word per minute rates according to the types of speech or types of content of the speech included in a recording.

In one example, target rate identifier 150 may also dynamically select target rate 152 for one or more particular users according to the responses by the one or more users during playback. In one example, a user response detection interface 160 may include one or more interfaces selected to detect one or more types of responses by one or more users, such as user 164 and user 166, during playback of recording 102. In one example, user response detection interface 160 may analyze responses by one or more of user 164 and user 166 during playback of recording 102, to detect a type of response, and generate user response 162, indicating one or more of the type of a response and a recommended action to change the type of response. Target rate identifier 150 may receive user response 162 and analyze user response 162 to determine whether to dynamically adjust target rate 152 based on one or more of the type of response and a recommended action to change the type of response. In one example, a user profile accessed by target rate identifier 150 may also specify the type of action to take in response to particular types of user responses reported by user response detection interfaces 160.

In one example, in selecting a type of action to take in response to particular types of user responses reported by user response detection interface 160, target rate identifier 150 may select to adjust a target rate to attempt to modify a comprehension level 170 representing a user's comprehension of playback of recording 102. In one example, user responses may be categorized as indicating one of three levels within comprehension level 170 illustrated as an additional capacity 172, optimal capacity 174, and over capacity 176. In one example, optimal capacity 174 may represent a fastest playback for a particular user during which the user is able to optimally comprehend adjusted recording output 144 for the user's required purposes. In one example, one user may be able to optimally comprehend recording 102 played back at an adjusted playback rate 142 twice the normal speed, however, another user may be able to comprehend recording 102 played back at an adjusted playback rate 142 three times the normal speed, which indicates that a target rate yielding optimal capacity 174 for a same recording may vary from one user to another user. In one example, additional capacity 172 may represent a comprehension level at which the user could listen to the recording at a higher speed and continue to comprehend recording 102. In one example, over capacity 176 may represent a comprehension level at which the user is struggling to comprehend the recording at the current speed.

In one example, by target rate identifier 150 dynamically selecting and adjusting target rate 152 for playback of recording 102 for a particular one or more users, such as one or more of user 164 and user 166, adjusted recording output 144 is optimized for comprehension by the particular one or more user 164 and user 166. In one example, by target rate identifier 150 receiving user response 162 from user response detection interface 160 while the particular one or more users are listening to adjusted recording output 144, target rate identifier 150 may dynamically adjust target rate 152 and may also monitor user responses after adjusting target rate 152 to determine if further adjustments are needed or whether a user's comprehension reaches optimal capacity 174.

In one example, in addition to playback adjustment controller 140 adjusting the playback of recording 102 at an adjusted playback rate 142, playback adjustment controller 140 may adjust additional aspects of recording 102 during playback as adjusted recording output 144. For example, playback adjustment controller 140 may detect the position of user 164 or user 166 in relation to a selection of speakers and adjust the volume and selection of speakers from which to output adjusted recording output 144 to optimize the volume and audio aspects of the recording. In another example, playback adjustment controller 140 may detect the bandwidth available for streaming adjusted recording output 144 and adjust one or more aspects of the play of adjusted recording output 144 to optimize the output based on the bitrate available for the current bandwidth. In another example, playback adjustment controller 140 may detect visually similar frames of video within recording 102, such as multiple redundant advertisements inserted into a video stream or redundant opening or closing credits across multiple episodes, and edit out the visually similar frames, and accompanying audio, to remove redundant advertisements or redundant credits, to minimize the playback time of recording 102.

Figure 2:
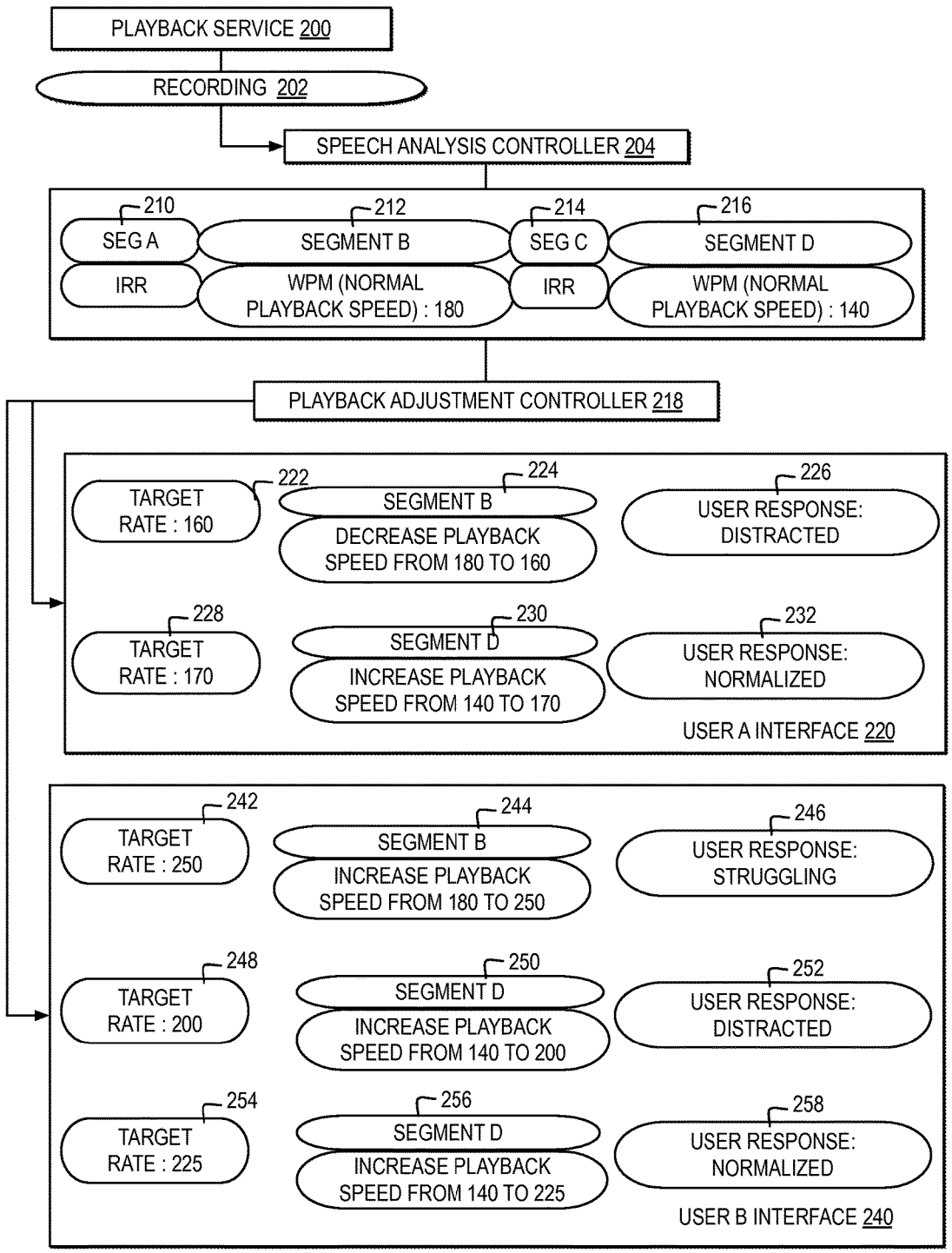
FIG. 2 is a block diagram illustrating one example of a playback of a recording separately adapted for different users to optimize comprehension for each of the users.

FIG. 2 illustrates one example of a block diagram of a playback of a recording separately adapted for different users to optimize comprehension for each of the users.

In one example, a playback service 200 controls playback of a recording 202 to one or more users. In one example, playback service 200 may control playback of recording 202 through a separate interface accessible by each user, such as through a user A interface 220, accessible by a first selection of one or more particular users, or a user B interface 240, accessible by a second selection of one or more particular users. For example, user A interface 220 and user B interface 240 may each represent one or more types of interfaces including, but not limited to, a browser interface, an application interface, and a physical input/output (I/O) interface. In one example, one or more components of playback system 100 are integrated into playback service 200. In another example, one or more components of playback system 100 are integrated into user A interface 220 and user B interface 240. In additional or alternate examples, playback service 200 may control playback of recording 202 to one or more users through additional or alternate interfaces.

In one example, recording 202 may include multiple types of recorded content including, but not limited to, audible speech, music, graphical images, video images, and other recordable media. In one example, recording 202 may include a single speaker, speaking in a particular language, with a particular dialect and one or more paces. In another example, recording 202 may include multiple speakers, speaking in one or more languages or in one or more dialects, at one or more paces.

In one example, playback service 200 or one or more of user A interface 220 and user B interface 240 may implement one or more instances of speech analysis controller 110, as illustrated by speech analysis controller 204, to analyze recording 200 and selectively segment recording 200 into two or more segments, such as a segment (seg) A 210, a segment B 212, a segment C 214, and a segment D 216.

In one example, speech analysis controller 204, in selectively segmenting recording 202, may determine one or more of a complexity identifier and a blocking identifier for each segment. In one example, speech analysis controller 204 identifies seg A 210 and seg C 214 as not containing relevant speech and sets a blocking identifier for each of seg A 210 and sec C 214 to irrelevant (IRR). In one example, speech analysis controller 204 identifies segment B 212 and segment D 216 as containing relevant speech and sets a complexity identifier for each segment to an average words per minute at normal playback speed for each segment. For example, segment B 212 includes a complexity identifier of 180 words per minute (WPM) and segment D 216 includes a complexity identifier of 140 WPM. In one example, the normal playback speed may match the same speed at which the content was recorded.

In one example, playback adjustment controller 218, representing one or more instances of playback adjustment controller 218, may adjust the playback of recording 202 within user A interface 220 by determining an adjusted playback rate based on a target rate specified for user A interface 220. In one example, during playback, as illustrated at reference numeral 222, a target rate for user A interface 220 is initially set to 160 WPM. In one example, as illustrated at reference numeral 224, for playback of segment B, playback adjustment controller 218 decreases the playback speed, at the adjusted playback rate, from 180 WPM to 160 WPM. In one example, during playback of segment B, user response detection interface 160 detects a response by one or more users accessing user A interface 220 to access the playback of recording 202. In one example, as illustrated at reference numeral 226, user response detection interface 160 detects a user response of "distracted", which indicates there is additional capacity for the target rate to be increased and the user continue to comprehend the playback. In one example, in response to the user response of additional capacity detected at reference numeral 226, playback adjustment controller 218 selects to dynamically adjust the target rate for user A interface 220 from 160 WPM to 170 WPM, as illustrated at reference numeral 228. In one example, the increment by which the target rate is increased may be set based on one or more of a user profile and an intensity of the user response. In one example, as illustrated at reference numeral 230, the user selects to continue playback to segment D, and playback adjustment controller 218 increases the playback speed from 140 WPM to 170 WPM. In one example, as illustrated at reference numeral 232, during playback of segment D, user response detection interface 160 detects a user response indicating the user's response is not struggling or distracted, which may indicate that the playback rate is currently at a speed for optimal comprehension. In the example, the playback of recording 202 through user A interface 220 includes a dynamic adjustment of the target rate based on user response to playback and includes dynamic adjustment of the playback rate of multiple segments to reach a playback rate matching the target rate.

In one example, playback adjustment controller 218 may adjust the playback of recording 202 within user B interface 240 by determining an adjusted playback rate based on a target rate specified for user B interface 240. In one example, during playback, as illustrated at reference numeral 242, a target rate for user B interface 240 is initially set to 250 WPM. In one example, as illustrated at reference numeral 244, for playback of segment B, playback adjustment controller 218 increases the playback speed, at the adjusted playback rate, from 180 WPM to 250 WPM. In one example, during playback of segment B, user response detection interface 160 detects a response by one or more users accessing user B interface 240 to access the playback of recording 202. In one example, as illustrated at reference numeral 246, user response detection interface 160 detects a user response indicating the user is struggling to comprehend the playback at the current target rate, indicating a comprehension level of over capacity, therefore the current target rate needs to be decreased. In one example, in response to the user response of struggling detected at reference numeral 246, playback adjustment controller 218 selects to dynamically adjust the target rate for user B interface 240 from 250 WPM to 200 WPM, as illustrated at reference numeral 248. In one example, the increment by which the target rate is decreased, from 250 WPM to 200 WPM, may be set based on one or more of a user profile and an intensity of the user response. In one example, as illustrated at reference numeral 250, the user selects to continue playback to segment D, and playback adjustment controller 218 increases the playback speed from 140 WPM to 200 WPM. In one example, as illustrated at reference numeral 252, during playback of segment D, user response detection interface 160 detects a user response of "distracted" indicating the user's response has additional capacity for comprehension, which indicates that the target rate may be increased. In one example, in response to the user response of additional capacity detected at reference numeral 252, playback adjustment controller 218 selects to dynamically adjust the target rate for user B interface 240 from 200 WPM to 225 WPM, as illustrated at reference numeral 254. In one example, the increment by which the target rate is increased, from 200 WPM to 225 WPM, may be set based on one or more of a user profile and an intensity of the user response. In one example, as illustrated at reference numeral 256, the user selects to either continue playback within segment D or replay segment D, and playback adjustment controller 218 increases the playback speed from 140 WPM to 225 WPM. In one example, as illustrated at reference numeral 258, during playback of segment D, user response detection interface 160 detects a user response indicating the user's response is normalized, which indicates that the playback rate is currently at a speed for a compression level of optimal capacity. In the example, the playback of recording 202 through user B interface 240 includes a dynamic adjustment of the target rate based on user response to playback and includes dynamic adjustment of the playback rate of multiple segments to reach a playback rate matching the target rate.

In one example, recording 202 may represent a recording of a two-hour lecture by a professor. In the example, students may access recording 202 to listen to the lecture. Students accessing recording 202 may want to optimize their time by minimizing the time it requires to watch the two hour lecture, while still maintaining optimal comprehension of the recording during playback. In one example, by identifying seg A 210 and sec C 214, which are segments that do not include relevant speech, with block identifiers of IRR, during playback of recording 202, students may select for playback adjustment controller 218 to automatically skip segments marked as IRR and reduce the playback time of recording 202 by the time of each of the skipped segments. In addition, while many playback systems may include an option for a user to select to increase the speed of playback by a fixed amount, such as 2 times or 2.5 times, if the rate of speech of the speaker is not consistent, increasing the speed of playback by a fixed amount may yield a playback that is too fast when the speaker's speech speeds up, or too slow when the speaker's speech slows down. In the example illustrated, by identifying the complexity identifier of each segment, including the words per minute at normal speed, if a professor speaks slowly in some portions and speaks quickly in others, during playback of recoding 202, students may select for playback adjustment controller 218 to automatically adjust the playback of each segment to a target rate, which requires adjusting the current playback rate to a rate that adjusts the original WPM in the segment to the WPM set in the target rate. In one example, by adjusting playback of segments to a target rate, when the professor's speech speeds up, such as in segment B 212, playback adjustment controller 218 may automatically decrease the playback speed to meet a WPM setting of a target rate, however, if the professor's speech slows down, such as in segment D 216, playback adjustment controller 218 may automatically increase the playback speed to meet the WPM setting of the target rate. In one example, in examples where a student may have difficulty comprehending the speech in recording 202 at the rate at which the speech is recorded, for example where the student is in the process of the learning the language primarily used in the speech or where the dialect spoken in the speech is difficult for the student to understand, the target rate for playback may also be set to a rate lower than the recorded words per minute at a normal playback rate, and the speech slowed at playback to meet the target rate, to allow for optimal comprehension without reducing the target rate any lower than necessary. Further, by monitoring the response of each student listening to recording 202 and dynamically adjusting a target rate, individually, for each student during playback, the playback of recording 202 may be adjusted to minimize the total playback time for each student, individually, while also dynamically adjusting the target rate to optimize capacity of comprehension for each student.

In another example, recording 202 may represent a recording of a public meeting that includes many different speakers. In the example, the public may access recording 202 to listen to the meeting. In the example, speech analysis controller 204, in addition to identifying the words per minute of segments for different speakers, may also identify other complexity identifiers through natural language processing analysis, such as distinguishing between different languages spoken or identifying speech that is muffled, based on the difficulty of translating the speech into recognizable textual words. In one example, speech analysis controller 204 may adjust the recorded words per minute set in a complexity identifier for a segment to reflect different languages or to reflect the difficulty of understanding the speech. In another example, speech analysis controller 204 may set indicators of the difficulty of understanding the speech with the recorded words per minute, such that playback adjustment controller 218 may adjust the playback rate from the words per minute of the original speech reflect the difficulty of understanding the speech. By distinguishing between differences in language and difficulty of understanding speech within the complexity identifier for a segment, finer levels of adjustment may be managed when marking segments for adjusted playback.

Figure 3:
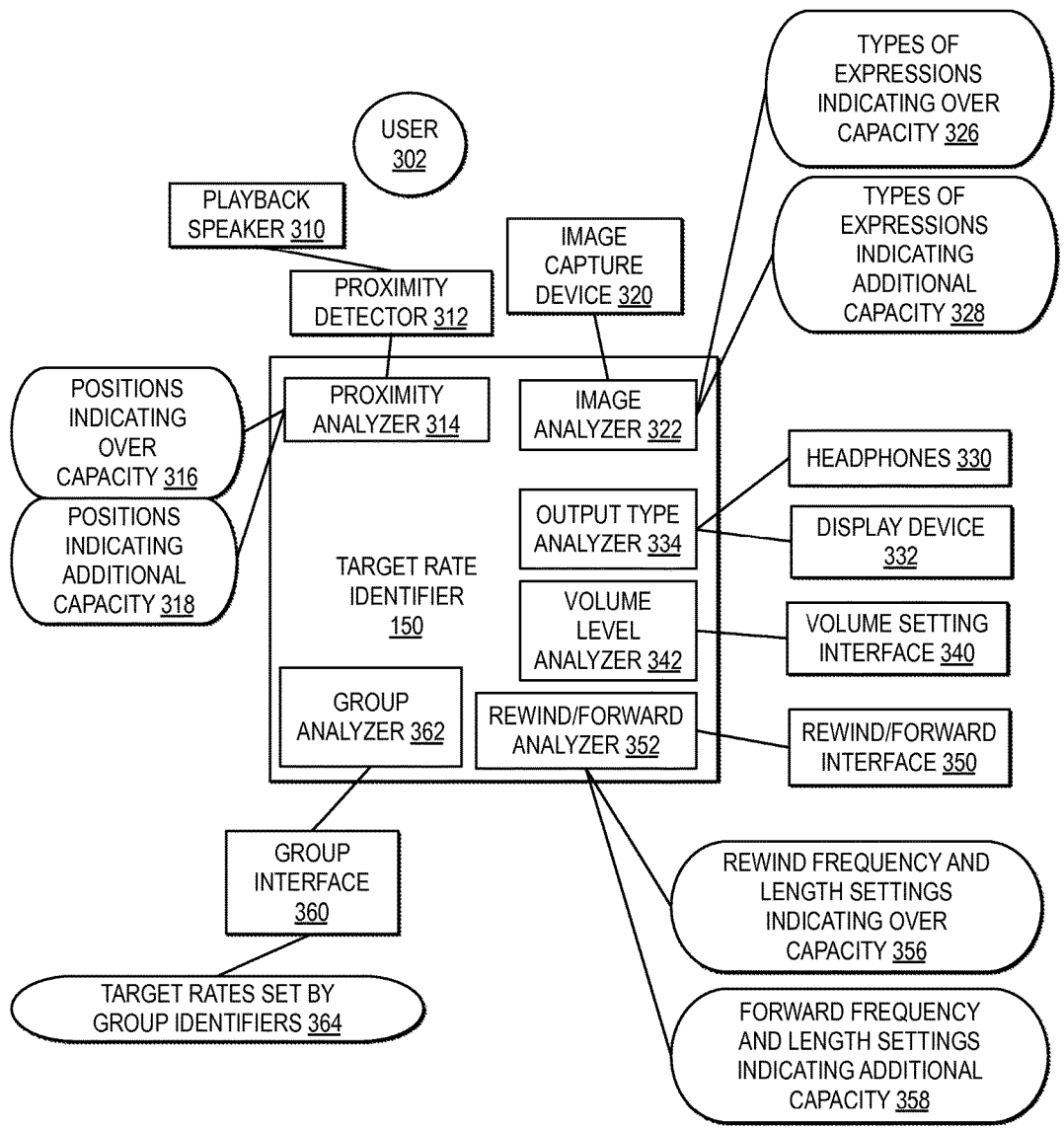
FIG. 3 is a block diagram illustrating one example of one or more user response detection interfaces accessed by a target rate identifier.

FIG. 3 illustrates one example of a block diagram of one or more user response detection interfaces accessed by a target rate identifier.

In one example, a target rate identifier 150 may include one or more analyzer components for analyzing one or more types of information accessed from one or more interfaces. In one example, target rate identifier 150 may interface with one or more additional or alternate types of interfaces and may include one or more additional or alternate analyzer components.

In one example, a user 302 listens to playback of a recording, such as adjusted recording output 144 from playback adjustment controller 140, from a playback speaker 310. In one example, user response detection interface 160 may include a proximity detector 312 that detects a proximity of user 302 to playback speaker 310. In one example, proximity detector 312 may detect a proximity of user 302 to playback speaker 310 indicating a proximity of user 302 holding playback speaker 310 up to the user's ear. In one example, playback speaker 310 may be integrated into a portable communication device, where a user may press playback speaker 310 closer to the user's ear if the playback is not easily comprehendible. In one example, proximity detector 312 may represent a gyroscope within the portable communication device that is able to detect the proximity of playback speaker 310 to a user's ear based on the tilt and rotation of the portable communication device in relation to a position that is generally indicative of a user's ear. In one example, proximity detector 312 detects an indicator of the proximity of an ear of user 302 to playback speaker 310 and provides the proximity indicator to a proximity analyzer of target rate identifier 150.

In one example, proximity analyzer 314 may apply one or more criteria for analyzing the proximity indicator received from proximity detector 312. For example, proximity analyzer 314 may access positions indicating over capacity 316, such as positions of playback speaker 310 within a close proximity to a user's ear for triggering proximity analyzer 314 to decrease a target rate, along with intensity settings for each position to indicate the amount of an increment to decrease the target rate. For example, proximity analyzer 314 may access positions indicating additional capacity of a user to comprehend a playback at higher speeds, along with intensity settings for each position to indicate the amount of an increment to increase the target rate. If proximity analyzer 314 detects that user 302 is pressing playback speaker 310 against the user's ear, proximity analyzer 314 may determine that the position of playback speaker 310 in relation to user 302 indicates a struggle to comprehend, which is included in positions indicating over capacity 316. In addition, proximity analyzer 314 may access positions indicating additional capacity 316, such as a user's proximity to playback speaker 310 indicating the user is not holding playback speaker 310, indicating user 302 may have additional capacity to comprehend the playback of the recording at a faster speed.

In one example, as user 302 listens to playback of a recording, such as adjusted recording output 144 from playback adjustment controller 140, an image capture device 320 may capture an image. In one example, user response detection interface 160 may include an image analyzer 322 that analyzes the image captured by image capture device 320 to determine a type of image captured. In one example, image capture device 320 may be integrated in a portable communication device that controls playback of adjusted recording output 144. In one example, image capture device 320 may capture an image of user 302. In another example, depending on the angle that the user is holding the portable communication device, image capture device 302 may capture images of an environment around user 302. In one example, image analyzer 322 may implement a facial recognition controller for analyzing an image captured by image capture device 320, if the image is an image of user 302, to identify a type of expression.

In one example, image analyzer 322 may apply one or more criteria for analyzing the image identified by image analyzer 322. For example, image analyzer 322 may access one or more types of expressions indicating over capacity, as illustrated at reference numeral 326, to decrease a target rate, along with intensity settings for each type of expression to indicate the amount of an increment to decrease the target rate. In one example, if a user's facial expression indicates confusion, furrowed brows, or a straining to read lips, these types of expressions may indicate a struggle to comprehend, indicating the current comprehension level is over capacity. For example, image analyzer 322 may access one or more types of expressions indicating additional capacity 328, along with intensity settings for each type of expression to indicate the amount of an increment to increase the target rate. In one example, if a user's facial expression indicates the user is yawning or the user's eye gaze is not directed to the video playback, these types of expressions may indicate that a user is not fully paying attention and that the user may continue to comprehend the playback at a faster rate.

In one example, as user 302 listens to playback of a recording, such as adjusted recording output 144 from playback adjustment controller 140, a user may listen to the playback through one or more output interfaces, in addition to or alternatively to playback speaker 310. For example, user 302 may listen to playback of a recording from headphones 330, for audio output, and from a display device 332, for playback of a video recording. In one example, output type analyzer 334 may analyze the types of output interfaces accessed by user 302 during playback of a recording and direct proximity analyzer 314 or image analyzer 322 to integrate the types of outputs into determining a target rate. In one example, if user 302 listens to a playback of a recording via headphone 330, image analyzer 322 may further analyze images captured by image capture device 320 for images indicating that a user is pressing headphones closer to the user's ears or cupping hands over the headphones, as indicators that the user is struggling to comprehend the playback. In another example, if user 302 watches playback of a recording via display device 332, image analyzer 322 may further analyze images captured by image capture device 320 for images indicating that a user is not paying attention to the output via display device 332, as an indicator that there is additional capacity for the speed of a playback to be increased and the user to continue to comprehend the playback.

In one example, as user 302 listens to playback of a recording, user 302 may selectively adjust a volume of the playback of the recording. In one example, volumes setting interface 340 may represent an interface through which a user may select inputs to adjust a volume of a playback of a recording. In one example, a volume level analyzer 342 analyzes a volume setting and changes by user 302 to the volume through volume setting interface 340. In one example, volume level analyzer 342 may trigger proximity analyzer 314 or image analyzer 322 to set an intensity based on the combination of a user placing playback speaker 310 in proximity to the user's ear and adjusting a volume or based on the combination of a user's facial expression with a volume adjustment. In one example, if user 302 is pressing playback speaker 310 against the user's ear and increasing the volume, the user's response may indicate a drop in volume in the recording that makes comprehension difficult, therefore proximity analyzer 314 may increase the increment by which a target rate is decreased. In another example, if user 302 is detected as actively watching display device 332, but decreasing the volume of the playback, the user's response may indicate the user has additional capacity, therefore image analyzer 322 may increment the target rate by small increments to increase the speed of the playback. In one example, in setting the target rate with a rate of speech, volume level analyzer 342 may also detect volume changes and target rate identifier 150 may include volume level targets, to normalize the volume of output of a recording, so that a user does not need to manually adjust the volume to compensate for changes in the level of volume of one or more speakers within a recording.

In one example, as user 302 listens to playback of a recording, user 302 may selectively rewind or forward the recording through a rewind/forward interface 350. In one example, rewind/forward interface 350 passes indicators when a recording is rewound or forwarded to a rewind/forward analyzer 352. Rewind/forward analyzer 352 may analyze a frequency and length of each rewind or forward action. In one example, rewind/forward analyzer 352 may apply one or more criteria for analyzing the frequency and length of each rewind or forward action during playback of the recording. For example, rewind/forward analyzer 352 may access criteria illustrated at reference numeral 356, for decreasing a target rate, based on rewind frequency and length settings indicating over capacity, such as settings that indicate a struggle to comprehend. In one example, the criteria illustrated at reference numeral 356 may specify that if a user rewinds a same portion of a recording two times, to slow the target rate by a 5% increment, and if a user rewinds the same portion of the recording three times, to slow the target rate by a 10% increment. For example, rewind/forward analyzer 352 may access criteria illustrated at reference numeral 358, for increasing a target rate, based on forward frequency and length settings that indicate additional capacity. In one example, the criteria illustrated at reference numeral 358 may specify that if a user forwards through two portions of a same segment, to increase the target rate by a 10% increment.

In another example, target rate identifier 150 may include a group analyzer 362 that accesses a group interface 360. In one example, group analyzer 362 analyzes the target rate settings by target rate identifier 150 and sends the target rate settings, with user profile information, to group interface 360. Group interface 360 may aggregate the target rate settings and user profile information for a particular recording and identify an average target rate for one or more types of group settings. Group interface 360 may generate target rates set by group identifier 364, which may include target rate settings, by segment of a recording, and by group characteristics. Group interface 360 may provide target rates set by group identifiers 364 to group analyzer 362, for a particular recording, during playback. Group analyzer 362 may analyze target rates set by group identifiers 364 to determine one or more group characteristics specified in a user profile and identify the target rates from among target rates set by group identifier 364 with group characteristics matching the user profile group characteristics. Target rate identifier 150 may initially set a target rate for a segment for playback based on one or more of the target rates from among target rates set by group identifier 364 with group characteristics matching the user profile group characteristics.

Figure 4:
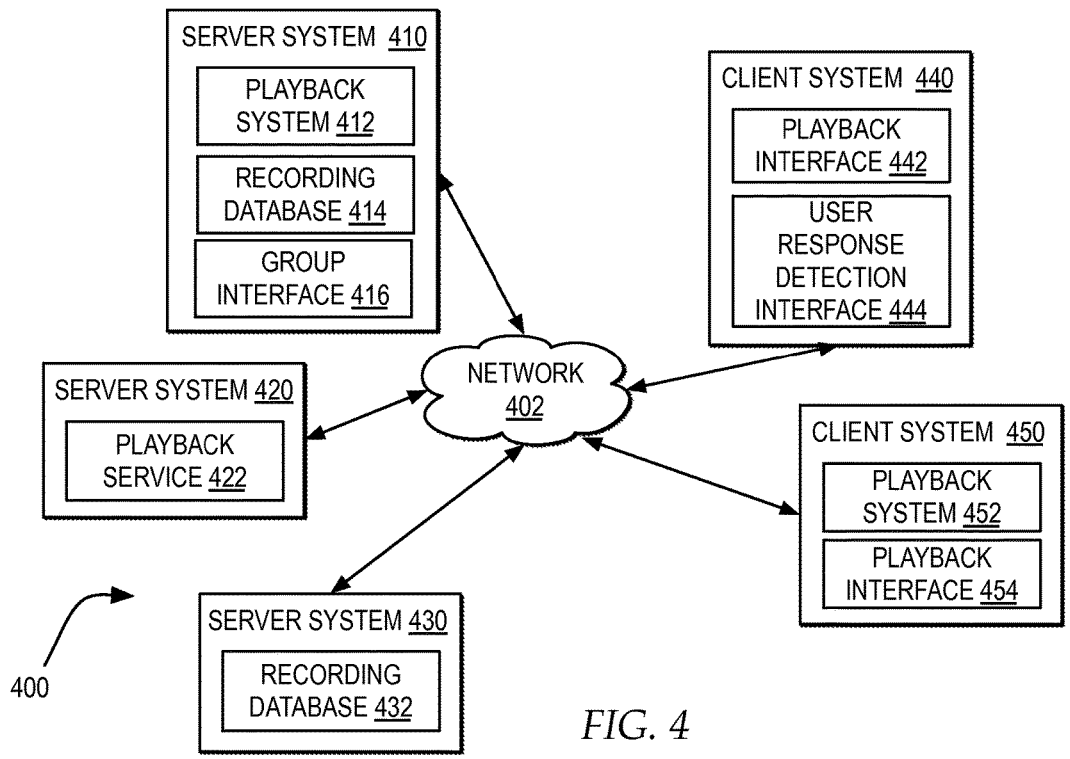
FIG. 4 is a block diagram illustrating one example of a network environment in which a playback system and playback interface are implemented.

FIG. 4 illustrates one example of a block diagram of a network environment in which a playback system and playback interface are implemented. One of ordinary skill in the art will appreciate that environment 400 is illustrative of one type of network environment that may support clients, servers and other components of a broadcast system and communication system. In addition, one of ordinary skill in the art will appreciate that the distribution of systems within network environment 400 is illustrative of a distribution of systems, however, other distributions of systems within a network environment may be implemented.

As illustrated, multiple systems within network environment 400 may be communicatively connected via network 402, which is the medium used to provide communications links between various devices and computer systems communicatively connected. Network 402 may include permanent connections such as wire or fiber optics cables and temporary connections made through telephone connections and wireless transmission connections, for example, and may include routers, switches, gateways and other hardware to enable a communication channel between the systems connected via network 402. Network 402 may represent one or more broadcast television networks, including cable, satellite, and internet based television networks across which programs are transmitted, packet-switching based networks, telephony based networks, local area and wire area networks, public networks, and private networks. Network environment 400 may implement multiple types of network architectures.

Network 402 and the systems communicatively connected within network environment 400 via network 402 may implement one or more layers of one or more types of network protocol stacks which may include one or more of a physical layer, a link layer, a network layer, a transport layer, a presentation layer, and an application layer. For example, network 402 may implement one or more of the Transmission Control Protocol/Internet Protocol (TCP/IP) protocol stack or an Open Systems Interconnection (OSI) protocol stack. In addition, for example, network 402 may represent the worldwide collection of networks and gateways that use the TCP/IP suite of protocols to communicate with one another.

In the embodiment, as illustrated, a client system 440 and a client system 550 are communicatively connected via network 402 to one or more of a server system 410, a server system 420, and a server system 430. Each of client system 440, client system 450, server system 410, server system 420, and server system 430 may represent one or more computer systems, such as computer system 600 of FIG. 6, to be described below.

In one example, client system 440 hosts a playback interface 442 and client system 450 hosts a playback interface 454, where playback interface 442 and playback interface 454 each represent instances of user A interface 220 or user B interface 240 through which adjusted recording output 144 is accessed, for one or more users. In one example, each of playback interface 442 and playback interface 454 may output adjusted recording output. In one example, playback interface 442 of client system 440 may receive adjusted recording output from one or more server systems, such as from the adjusted recording output from a playback system 412 hosted on server system 410 or from a playback server 422 hosted on server system 420. In one example, playback interface 454 may receive adjusted recording output from one of server system 410 and server system 420, or from playback system 452, hosted on client system 450. In one example, playback system 452 may playback one or more recordings stored in client system 450.

In one example, server system 410 may host playback system 412, where playback system 412 may represent an instance of playback system 100, for controlling playback of one or more recordings from a recording database 414 hosted by server system 410. In one example, server system 420 may host playback service 422, which may represent an instance of one or more of the components of playback system 100, provided as a service, for playback of one or more recordings from one or more sources, including, but not limited to, recording database 414 and a recording database 432. In one example, server system 430 may host one or more recordings in a recording database 432, for playback by playback service 422 to one or more playback interfaces on client systems.

In one example, client system 440 may include playback interface 422 for receiving the adjusted recording output from playback system 412 or playback server 422, and a user response detection interface 444 for detecting one or more user responses to the adjusted recording output and sending the one or more user responses to playback system 412 or playback server 422. In one example, client system 450 may include playback system 452, which incorporates a user response detection interface.

In one example, playback system 412 may simultaneously stream a recording from recording database 414 to different users at different client systems, with each recording streamed as a separate adjusted recording output specified for optimized comprehension by the users at the different client systems. In one example, recordings in recording database 414, recording database 432, or on one or more of client system 440 and client system 450 may be provided as live streams, on-demand streams, on-demand downloads, scheduled downloads, viewable media, program playback and other recordable and viewable sources of recorded media.

In one example, client system 440 and client system 450, executing playback interface 442 and playback interface 454, respectively, may represent stand-alone recording playback devices. In another example, client system 440 and client system 450 may represent general computer systems executing playback interface 442 and playback interface 454, respectively, through a browser or other interface, running as functions of the browser or other interface, as plug-ins, as stand-alone functions, or as other executable components of the computer system. In one example, client system 440 and client system 450 may represent portable communication devices. In one example, each of server system 410, server system 420, and server system 430 may represent a networked environment including multiple server systems.

In one example, one or more server systems may include a group interface, such as group interface 416, which may represent an instance of group interface 360. In one example, group interface 416 may detect target rate settings and user responses to adjusted recording output from one or more client systems, such as client system 440 and client system 450. Group interface 416 may access user profiles for one or more users access client system 440 and client system 450, either from a database hosted by server system 410 or from client system 440 or client system 450, and detect one or more characteristics of each of the users. Group interface 416 may accumulate target rate settings and user responses to a recording from users with the same characteristics, as group identifiers. In addition, group interface 416 may provide the target rate settings by group identifiers to one or more of playback system 412, playback server 422, or playback system 452 for use in determining target rates for segments of the recording based on group identifiers.

Figure 5:
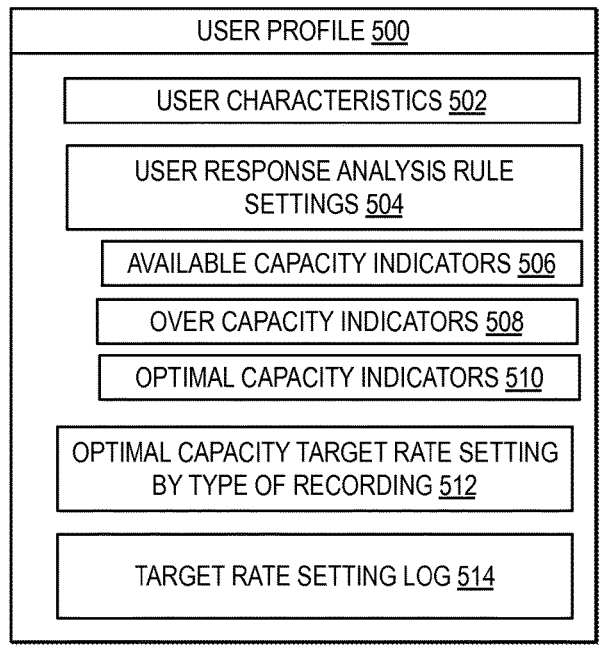
FIG. 5 is a block diagram illustrating one example of a user profile for specifying an adjusted playback of a recording for optimized comprehension by a user.

FIG. 5 illustrates one example of a block diagram of a user profile for specifying an adjusted playback of a recording for optimized comprehension by a user.

In one example, a user profile 500 represents an instance of one or more of user profile 154 and user profile 156. In one example, target rate identifier 150 may update information stored in user profile 500. In one example, a user may update information stored in user profile 500. In another example, one or more additional services or components may update information stored in user profile 500. In one example, one or more elements of user profile 500 may be distributed in multiple records stored among one or more systems.

In one example, user profile 500 may include user characteristics 502. User characteristics 502 may include one or more characteristics of a user that may impact the user's ability to comprehend different types of speech. In one example, user characteristics 502 may include one or more particular languages or particular dialects understood by a user. In one example, user characteristics 502 may include specifications of a user's comprehension level for different types of output interfaces.

In one example, user profile 500 may include user response analysis rule settings 504. In one example, user response analysis rule settings 504 may include one or more settings for application by one or more of the analyzer components of target rate identifier 150, such as, but not limited to, proximity analyzer 314, image analyzer 322, output type analyzer 334, volume level analyzer 342, rewind/forward analyzer 352, and group analyzer 362. In one example, user response analysis rule settings 504 may be further classified according to available capacity indicators 506, over capacity indicators 508, and optimal capacity indicators 510. In one example, available capacity indicators 506 specify settings that indicate a particular user has additional capacity to comprehend a playback at a higher speed. In one example, over capacity indicators 508 specify settings that indicate a particular user is struggling to comprehend a playback of a recording and a target rate needs to be decreased. In one example, optimal capacity indicators 510 specify settings that indicate that the user is actively listening to and comprehending the playback at the current target rate. User response analysis rule settings 504 may also specify intensity settings for setting the increments by which target rules are adjusted.

In one example, user profile 500 may include optimal capacity target rate settings by type of recording 512. In one example, optimal capacity target rate settings by type of recording 512 may specify one or more target rates, each specified according to a type of recording, at which playback of the recording may be optimized. In one example, a type of recording may include the type of media of the recording, the quality of the recording, the number of speakers on the recording, and other information that may be provided in the metadata of a recording or detectable by analyzing the recording contents. In one example, optimal capacity target rate settings by type of recoding 512 may specify a starting target rate for a user, to be adjusted by target rate identifier 150 based on user responses and other information.

In one example, user profile 500 may include target rate setting log 514. In one example, as target rate identifier 150 dynamically adjusts the target rate for a recording, the target rate adjustments are recorded in target rate setting log 514. In addition, the one or more user responses detected by target rate identifier 150 triggering adjustment to a target rate may be recorded in target rate setting log 514. If a target rate is adjusted for a user response indicating capacity available to result in a user response indicating optimal capacity, the target rate at which a user response indicating optimal capacity is reached is recorded in target rate setting log 514. In one example, based on target rate setting log 514, target rate identifier 150 may analyze target rate settings that yield a user response indicating a comprehension level of optimal capacity and adjust optimal capacity target rate settings by type of recording 512 to reflect the current target rate settings that yield a user response indicating a comprehension level of optimal capacity for a particular type of recording.

Figure 6:
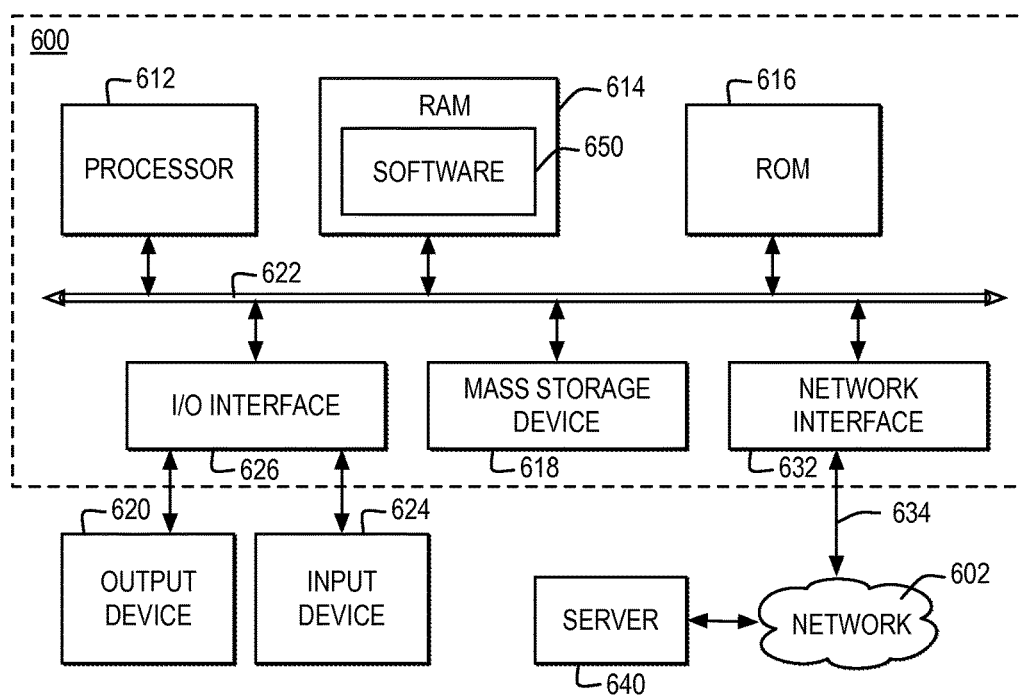
FIG. 6 is a block diagram illustrating one example of a computer system in which one embodiment of the invention may be implemented.

FIG. 6 illustrates a block diagram of one example of a computer system in which one embodiment of the invention may be implemented. The present invention may be performed in a variety of systems and combinations of systems, made up of functional components, such as the functional components described with reference to a computer system 600 and may be communicatively connected to a network, such as network 602.

Computer system 600 includes a bus 622 or other communication device for communicating information within computer system 600, and at least one hardware processing device, such as processor 612, coupled to bus 622 for processing information. Bus 622 preferably includes low-latency and higher latency paths that are connected by bridges and adapters and controlled within computer system 600 by multiple bus controllers. When implemented as a server or node, computer system 600 may include multiple processors designed to improve network servicing power.

Processor 612 may be at least one general-purpose processor that, during normal operation, processes data under the control of software 650, which may include at least one of application software, an operating system, middleware, and other code and computer executable programs accessible from a dynamic storage device such as random access memory (RAM) 614, a static storage device such as Read Only Memory (ROM) 616, a data storage device, such as mass storage device 618, or other data storage medium. Software 650 may include, but is not limited to, code, applications, protocols, interfaces, and processes for controlling one or more systems within a network including, but not limited to, an adapter, a switch, a server, a cluster system, and a grid environment.

Computer system 600 may communicate with a remote computer, such as server 640, or a remote client. In one example, server 640 may be connected to computer system 600 through any type of network, such as network 602, through a communication interface, such as network interface 632, or over a network link that may be connected, for example, to network 602.

In the example, multiple systems within a network environment may be communicatively connected via network 602, which is the medium used to provide communications links between various devices and computer systems communicatively connected. Network 602 may include permanent connections such as wire or fiber optics cables and temporary connections made through telephone connections and wireless transmission connections, for example, and may include routers, switches, gateways and other hardware to enable a communication channel between the systems connected via network 602. Network 602 may represent one or more of packet-switching based networks, telephony based networks, broadcast television networks, local area and wire area networks, public networks, and restricted networks.

Network 602 and the systems communicatively connected to computer 600 via network 602 may implement one or more layers of one or more types of network protocol stacks which may include one or more of a physical layer, a link layer, a network layer, a transport layer, a presentation layer, and an application layer. For example, network 602 may implement one or more of the Transmission Control Protocol/Internet Protocol (TCP/IP) protocol stack or an Open Systems Interconnection (OSI) protocol stack. In addition, for example, network 602 may represent the worldwide collection of networks and gateways that use the TCP/IP suite of protocols to communicate with one another. Network 602 may implement a secure HTTP protocol layer or other security protocol for securing communications between systems.

In the example, network interface 632 includes an adapter 634 for connecting computer system 600 to network 602 through a link and for communicatively connecting computer system 600 to server 640 or other computing systems via network 602. Although not depicted, network interface 632 may include additional software, such as device drivers, additional hardware and other controllers that enable communication.

When implemented as a server, computer system 600 may include multiple communication interfaces accessible via multiple peripheral component interconnect (PCI) bus bridges connected to an input/output controller, for example. In this manner, computer system 600 allows connections to multiple clients via multiple separate ports and each port may also support multiple connections to multiple clients.

In one embodiment, the operations performed by processor 612 may control the operations of flowchart of FIGS. 7-14 and other operations described herein. Operations performed by processor 612 may be requested by software 650 or other code or the steps of one embodiment of the invention might be performed by specific hardware components that contain hardwired logic for performing the steps, or by any combination of programmed computer components and custom hardware components. In one embodiment, one or more components of computer system 600, or other components, which may be integrated into one or more components of computer system 600, may contain hardwired logic for performing the operations of flowcharts in FIGS. 7-14.

In addition, computer system 600 may include multiple peripheral components that facilitate input and output. These peripheral components are connected to multiple controllers, adapters, and expansion slots, such as input/output (I/O) interface 626, coupled to one of the multiple levels of bus 622. For example, input device 624 may include, for example, a microphone, a video capture device, an image scanning system, a keyboard, a mouse, or other input peripheral device, communicatively enabled on bus 622 via I/O interface 626 controlling inputs. In addition, for example, output device 620 communicatively enabled on bus 622 via I/O interface 626 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 6, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 6 may vary. Furthermore, those of ordinary skill in the art will appreciate that the depicted example is not meant to imply architectural limitations with respect to the present invention.

Figure 7:
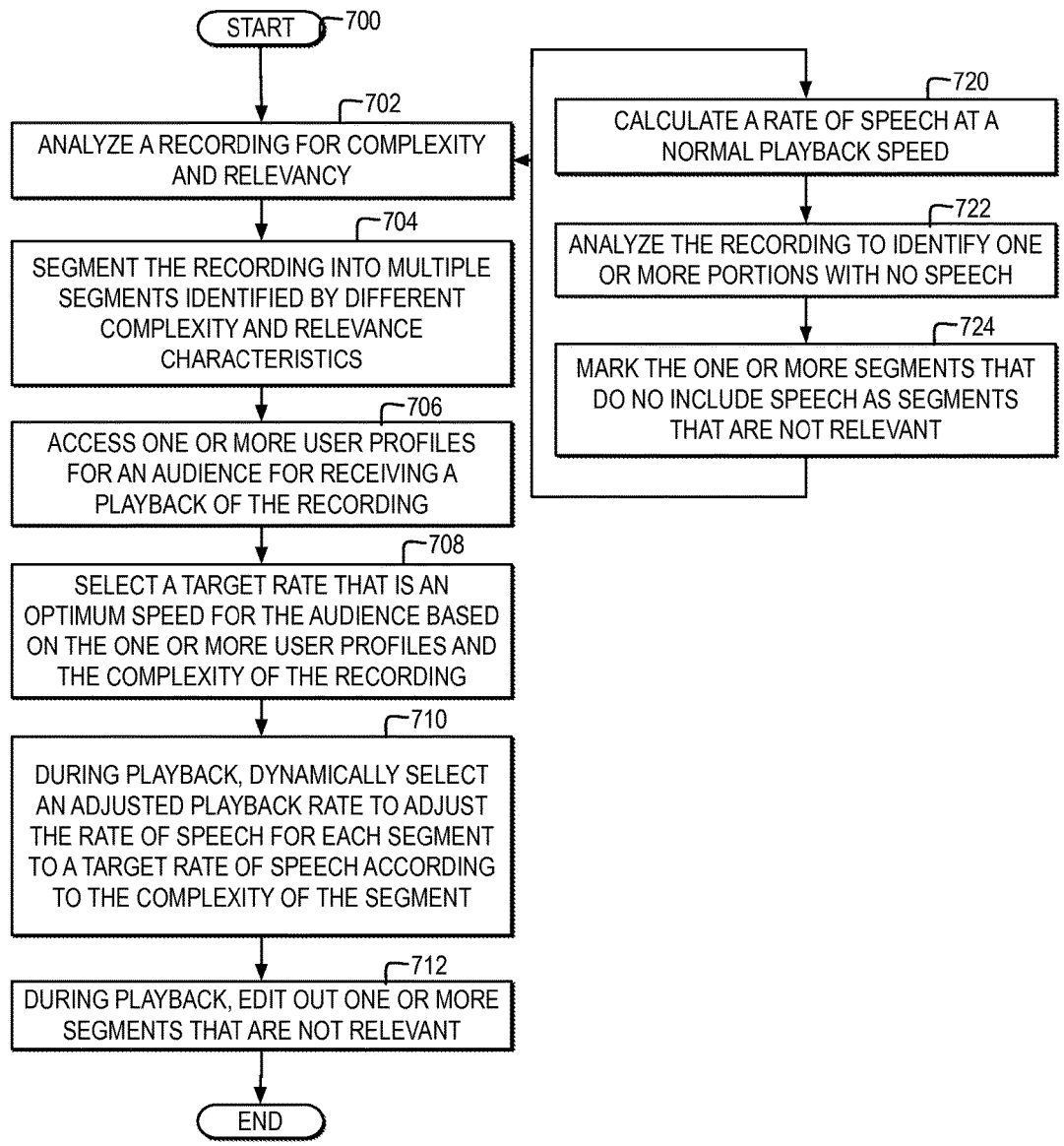
FIG. 7 is a high level logic flowchart of a process and computer program for adapting a playback of a recording to optimize comprehension.

FIG. 7 illustrates a high level logic flowchart of a process and computer program for adapting a playback of a recording to optimize comprehension.

In one example, the process and computer program start at block 700 and thereafter proceeds to block 702. Block 702 illustrates analyzing a recording for complexity and relevancy. In one example, analyzing a recording for complexity and relevancy may include the process passing to block 720. Block 720 illustrates analyzing a recording for complexity by calculating a rate of speech at a normal playback speed. Next, block 722 illustrates analyzing a recording for relevancy by analyzing the recording to identify one or more portions of the recording without any speech. Next, block 724 illustrates marking the one or more segments that do no include speed as segments that are not relevant, and the process passes to block 704.

Next, block 704 illustrates segmenting the recording into multiple segments identified by different complexity and relevance characteristics. Thereafter, block 706 illustrates accessing one or more user profiles for an audience for receiving a playback of the recording. Next, block 708 illustrates selecting a target rate that is an optimum speed for the audience based on the one or more user profiles and the complexity of the recording. Thereafter, block 710 illustrates, during playback, dynamically selecting an adjusted playback rate to adjust the rate of speech for each segment to a target rate of speech according to the complexity of the segment. Next, block 712 illustrates, during playback, editing out one or more segments that are not relevant.

Figure 8:
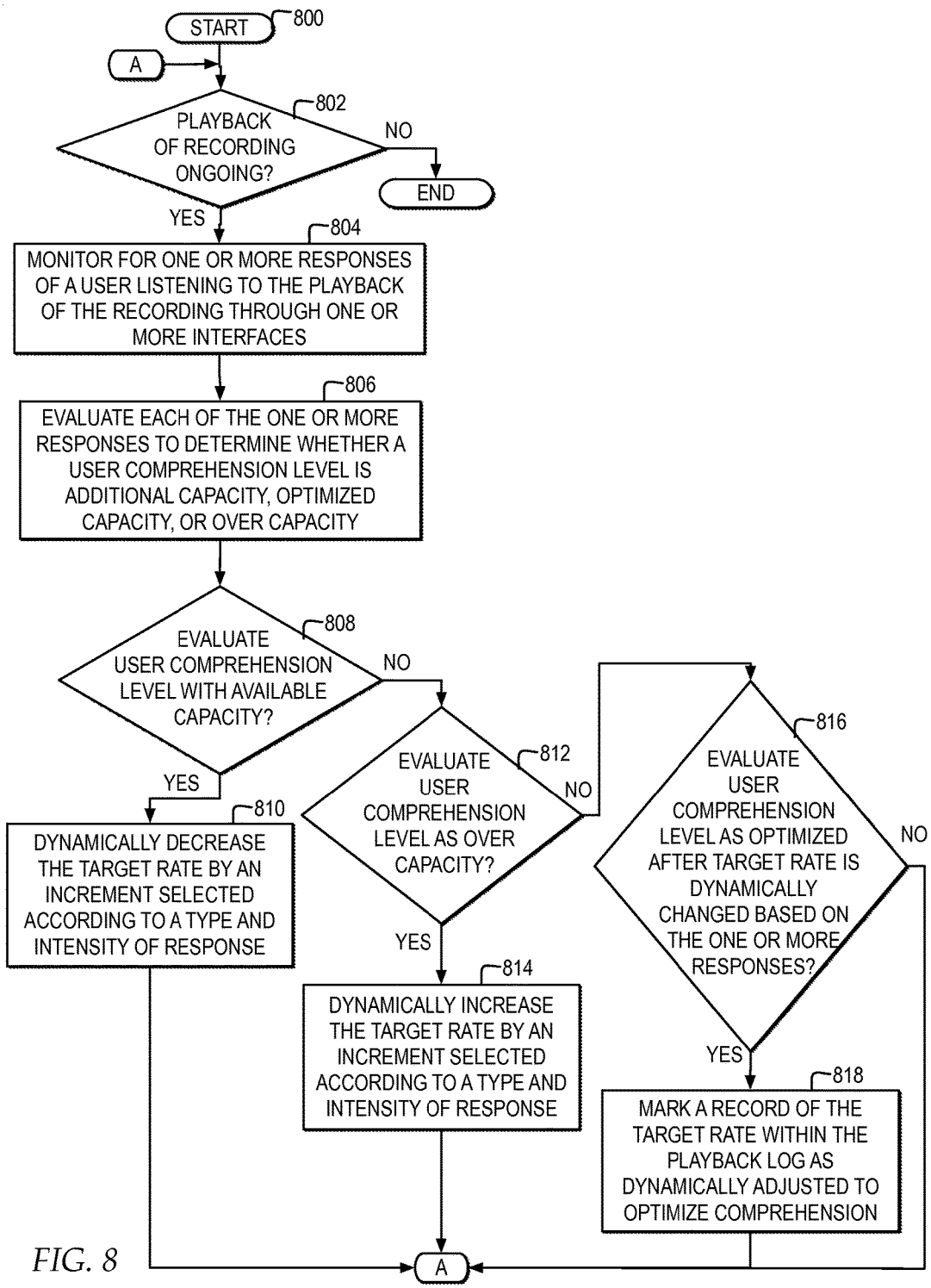
FIG. 8 is a high level logic flowchart of a process and computer program for dynamically adjusting a playback speed of a recording based on one or more responses by one or more users listening to the recording.

FIG. 8 illustrates a high level logic flowchart of a process and computer program for dynamically adjusting a playback speed of a recording based on one or more responses by one or more users listening to the recording.

In one example, the process and computer program starts at block 800 and thereafter proceeds to block 802. Block 802 illustrates a determination of whether playback of a recording is ongoing. In one example, playback of a recording may be detected as ongoing if a recording is being played, reversed, or forwarded. In one example, playback of a recording may be detected as ongoing within a particular window of time after a recording is stopped. In one example, playback of a recording may be detected while a user has a recoding ready to be selected for playback within an interface. At block 802, if a playback of a recording is detected as ongoing, then the process passes to block 804.

Block 804 illustrates monitoring for one or more responses of a user listening to the playback of the recording through one or more interfaces. Next, block 806 illustrates evaluating each of the one or more responses to determine whether a user comprehension level is available capacity, optimal capacity, or over capacity. Thereafter, block 808 illustrates a determination whether a user comprehension level is evaluated as available capacity. At block 808, if a user comprehension level is evaluated as available capacity, then the process passes to block 810. Block 810 illustrates dynamically decreasing the target rate by an increment selected according to a type and intensity of response, and the process returns to block 802.

Returning to block 808, if a user comprehension level is evaluated as not available capacity, then the process passes to block 812. Block 812 illustrates a determination whether a user comprehension level is evaluated as over capacity. At block 812, if the user comprehension level is evaluated as over capacity, then the process passes to block 814. Block 814 illustrates dynamically increasing the target rate by an increment selected according to a type and intensity of response, and the process returns to block 802.

Returning to block 812, if block 812 if a user comprehension level is evaluated as not over capacity, then the process passes to block 816. Block 816 illustrates a determination whether a user compression level reaches optimal capacity after a target rate is dynamically changed based on the one or more responses. At block 816, if a user comprehension level reaches optimal capacity after a target rate is dynamically changed based on the one or more responses, then the process passes to block 818. Block 818 illustrates marking a record of the target rate within a playback log as dynamically adjusted to optimal capacity comprehension, and the process returns to block 802. At block 816, if a user comprehension level does not reach optimal capacity after a target rate is dynamically changed based on the one or more responses, then the process returns to block 802.

Figure 9:
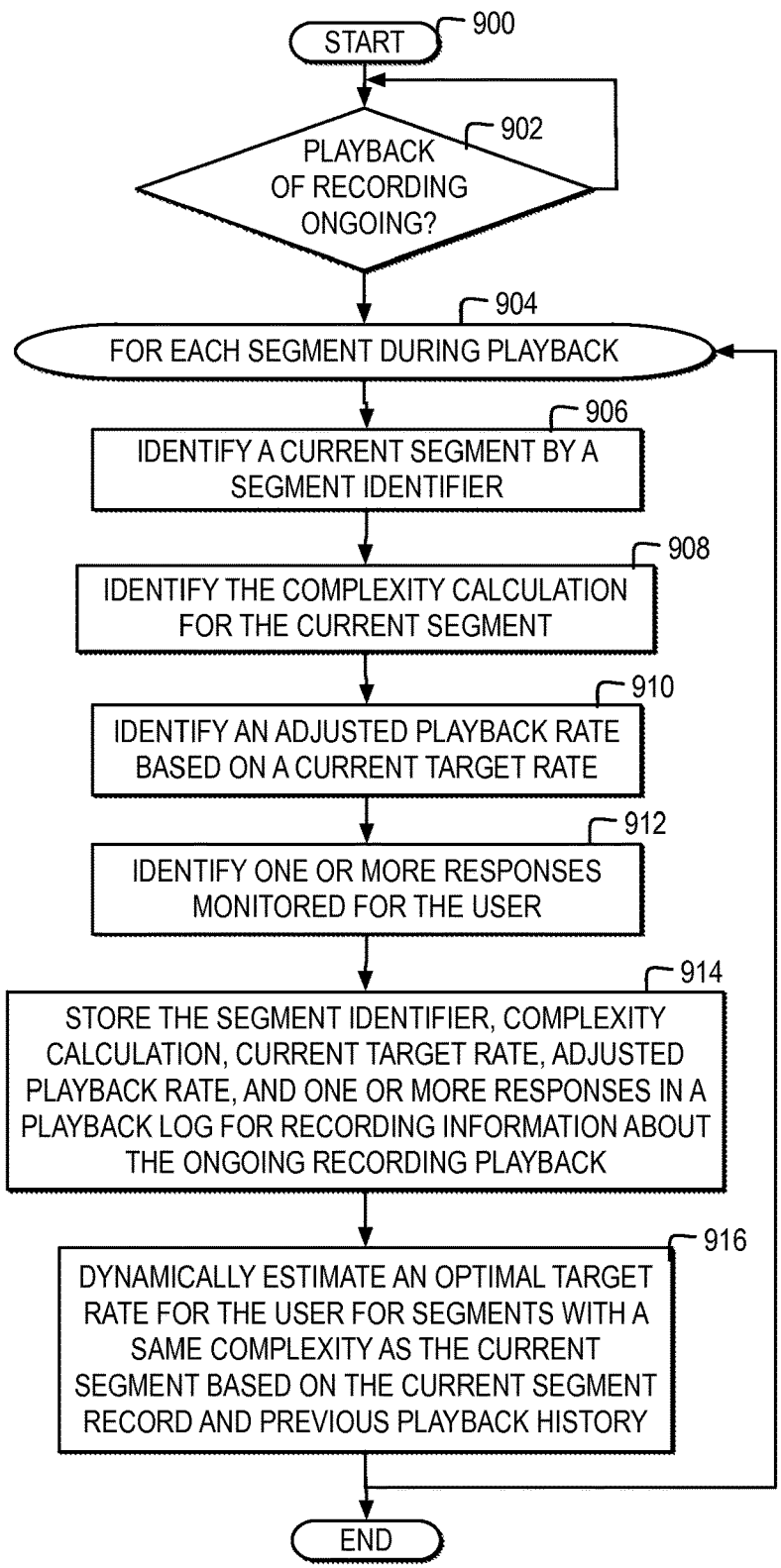
FIG. 9 is a high level logic flowchart of a process and computer program for tracking target rate adjustments for a particular user in a user profile.

FIG. 9 illustrates a high level logic flowchart of a process and computer program for tracking target rate adjustments for a particular user in a user profile. In one example, the process and computer program start at block 900 and thereafter proceed to block 902. Block 902 illustrates a determination whether a playback of a recording is ongoing. At block 902, if a playback of a recording is ongoing, then the process passes to block 904. Block 904 illustrates, for each segment during playback, the process passes to block 906. Block 906 illustrates identifying a current segment by a segment identifier. Next, block 908 illustrates identifying the complexity calculation for the current segment. Thereafter, block 910 illustrates identifying an adjusted playback rate, such as the adjusted words per minute, based on a current target rate. Next, block 912 illustrates identifying one or more responses monitored for the user. Thereafter, block 914 illustrates storing the segment identifier, complexity calculation, current target rate, adjusted playback rate, and one or more responses in playback log for recording information about the ongoing recording playback. Next, block 916 illustrates dynamically estimating an optimal target rate for the user for segments with a same complexity as the current segment based on the current segment record and previous playback history, and the process ends for the segment, and continues for a next segment if the playback of the recording is ongoing for a next segment.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method, comprising:

analyzing, by a computer, a single instance of a recording using natural language processing to translate one or more spoken words in the single instance of the recording into textual language;

identifying, by the computer, a separate complexity of each translation of each of the one or more spoken words to reflect a rate of speech at a normal playback speed and to reflect a difficulty performing natural language processing to detect each spoken word within the single instance of the recording and translate each spoken word in the single instance of the recording into textual language, each separate complexity specifying a different speed;

analyzing, by the computer, the single instance of the recording to identify a plurality of segments of the recording for each separate complexity, each of the plurality of segments set to a separate length for a separate continuous portion of the one or more spoken words of a same complexity;

selecting, by the computer, a target rate at which to playback the single instance of the recording for access by a particular user from among a plurality of users, the target rate specifying a fastest optimal speed at which the particular user listening to the single instance of the recording is able to comprehend the playback; and during playback of the single instance of the recording, modifying, by the computer, playback of the single instance of the recording in an interface accessible to the particular user to contiguously be at the target rate, wherein a separate adjusted playback rate is applied to each of the plurality of segments to adjust the playback rate of speech from the separate complexity of the rate of speech at the normal playback speed to the target rate.

2. The method according to claim 1, further comprising:
during playback of the single instance of the recording, monitoring, by the computer, through one or more interfaces selected to detect one or more types of responses by one or more users, for one or more particular responses by the particular user indicative of a comprehension level of the playback of the single instance of the recording by the particular user;

analyzing, by the computer, the one or more particular responses to identify a type of response indicating the comprehension level from among a plurality of types of responses and a recommended action to change the type of response, the plurality of types of responses comprising a first response that the particular user has additional capacity for comprehension, a second response that the particular user is at an optimal capacity for comprehension, and a third response that the particular user is over capacity for comprehension; and responsive to the comprehension level not evaluated as the second response that the particular user is at the optimal capacity for comprehension, dynamically adjusting, by the computer, the target rate based on the comprehension level.

3. The method according to claim 2, further comprising:
responsive to the comprehension level evaluated as additional capacity for comprehension of the playback at a faster speed, dynamically increasing, by the computer, a speed set in the target rate; and responsive to the comprehension level evaluated as over capacity for comprehension of the playback at a current speed for the target rate, dynamically decreasing, by the computer, the current speed set in the target rate.

4. The method according to claim 2, wherein during playback of the single instance of the recording, monitoring, by the computer, through one or more interfaces selected to detect one or more types of responses by one or more users, for one or more particular responses by the particular user indicative of a comprehension level of the playback of the single instance of the recording by the particular user further comprises:

detecting, by the computer, a proximity of the particular user to a speaker outputting the playback of the single instance of the recording through the one or more interfaces; and responsive to detecting the proximity of the particular user to the speaker within a threshold distance of the speaker, evaluating, by the computer, the comprehension level of the particular user as over capacity for comprehension.

5. The method according to claim 2, wherein during playback of the single instance of the recording, monitoring, by the computer, through one or more interfaces selected to detect one or more types of responses by one or more users, for one or more particular responses by the particular user indicative of a comprehension level of the playback of the single instance of the recording by the particular user further comprises:

capturing, by the computer, one or more images of the particular user during the playback of the single instance of the recording;

analyzing, by the computer, the captured one or more images of the particular user to identify one or more facial features associated with one or more expressions;

responsive to the one or more expressions matching one or more specified expressions set as indicating struggling, evaluating, by the computer, the comprehension level of the particular user as over capacity; and responsive to the one or more expressions matching one or more specified expressions set as indicating distraction, evaluating, by the computer, the comprehension level of the particular user as having additional capacity available.

6. The method according to claim 2, wherein during playback of the single instance of the recording, monitoring, by the computer, through one or more interfaces selected to detect one or more types of responses by one or more users, for one or more particular responses by the particular user indicative of a comprehension level of the playback of the single instance of the recording by the particular user, further comprises:

monitoring, by the computer, a frequency and length of one or more user selections of one or more of forwarding the playback and reversing the playback;

analyzing the frequency and length of the one or more user selections;

responsive to the frequency and length of the one or more user selections of reversing the playback exceeding a reverse threshold setting, evaluating, by the computer, the comprehension level of the particular user as over capacity; and responsive to the frequency and length of the one or more user selections of forwarding the playback exceeding a forward threshold setting, evaluating, by the computer, the comprehension level of the particular user as comprising additional capacity.

7. The method according to claim 1, wherein analyzing, by a computer, a single instance of a recording using natural language processing to translate one or more spoken words in the single instance of the recording into textual language further comprises:

analyzing the textual language against at least one topic selected by a user to determine if the textual language is relevant to the at least one topic; and marking at least one portion of the single instance of the recording comprising a selection of textual language that is not relevant to the at least one topic.

8. The method according to claim 1, further comprising:
analyzing, by the computer, each of the plurality of segments of the single instance of the recording for relevance, wherein each separate segment comprising silence is marked as irrelevant; and
during playback of the single instance of the recoding, by the computer, omitting one or more segments marked as irrelevant from among the plurality of segments.

9. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:
program instructions to analyze a single instance of a recording using natural language processing to translate one or more spoken words in the single instance of the recording into textual language;
program instructions to identify a separate complexity of each translation of each of the one or more spoken words to reflect a rate of speech at a normal playback speed and to reflect a difficulty performing natural language processing to detect each spoken word within the single instance of the recording and translate each spoken word in the single instance of the recording into textual language, each separate complexity specifying a different speed;
program instructions to analyze the single instance of the recording to identify a plurality of segments of the recording for each separate complexity, each of the plurality of segments set to a separate length for a separate continuous portion of the one or more spoken words of a same complexity;
program instructions to select a target rate at which to playback the single instance of the recording for access by a particular user from among a plurality of users, the target rate specifying a fastest optimal speed at which the particular user listening to the single instance of the recording is able to comprehend the playback; and
program instructions to, during playback of the single instance of the recording, modify playback of the single instance of the recording in an interface accessible to the particular user to contiguously be at the target rate, wherein a separate adjusted playback rate is applied to each of the plurality of segments to adjust the playback rate of speech from the separate complexity of the rate of speech at the normal playback speed to the target rate.

10. The computer system according to claim 9, the stored program instructions further comprising:
program instructions to, during playback of the single instance of the recording, through one or more interfaces selected to detect one or more types of responses by one or more users, for one or more particular responses by the particular user indicative of a comprehension level of the playback of the single instance of the recording by the particular user;
program instructions to analyze the one or more particular responses to identify a type of response indicating the comprehension level from among a plurality of types of responses and a recommended action to change the type of response, the plurality of types of responses comprising a first response that the particular user has additional capacity for comprehension, a second response that the particular user is at an optimal capacity for comprehension, and a third response that the particular user is over capacity for comprehension; and
program instructions, responsive to the comprehension level not evaluated as the second response that the particular user is at the optimal capacity for comprehension, dynamically adjusting, by the computer, the target rate based on the comprehension level.

11. The computer system according to claim 10, the stored program instructions further comprising:
program instructions, responsive to the comprehension level evaluated as additional capacity for comprehension of the playback at a faster speed, dynamically increasing, by the computer, a speed set in the target rate; and
program instructions, responsive to the comprehension level evaluated as over capacity for comprehension of the playback at a current speed for the target rate, dynamically decreasing, by the computer, the current speed set in the target rate.

12. The computer system according to claim 10, the stored program instructions further comprising:
program instructions to detect a proximity of the particular user to a speaker outputting the playback of the single instance of the recording through the one or more interfaces; and
program instructions, responsive to detecting the proximity of the particular user to the speaker within a threshold distance of the speaker, to evaluate the comprehension level of the particular user as over capacity for comprehension.

13. The computer system according to claim 10, the stored program instructions further comprising:
program instructions to capture one or more images of the particular user during the playback of the single instance of the recording;
program instructions to analyze the captured one or more images of the particular user to identify one or more facial features associated with one or more expressions;
program instructions, responsive to the one or more expressions matching one or more specified expressions set as indicating struggling, to evaluate the comprehension level of the particular user as over capacity; and
program instructions, responsive to the one or more expressions matching one or more specified expressions set as distracted, to evaluate the comprehension level of the particular user as having additional capacity.

14. The computer system according to claim 10, the stored program instructions further comprising:
program instructions to monitor a frequency and length of one or more user selections of one or more of forwarding the playback and reversing the playback;
program instructions to analyze the frequency and length of the one or more user selections;
program instructions, responsive to the frequency and length of the one or more user selections of reversing the playback exceeding a reverse threshold setting, to evaluate the comprehension level of the particular user as over capacity; and
program instructions, responsive to the frequency and length of the one or more user selections of forwarding the playback exceeding a forward threshold setting, to evaluate the comprehension level of the particular user as comprising additional capacity.

15. The computer system according to claim 9, the stored program instructions further comprising:
  program instructions to analyze the textual language against at least one topic selected by a user to determine if the textual language is relevant to the at least one topic; and
  program instructions to mark at least one portion of the single instance of the recording comprising a selection of textual language that is not relevant to the at least one topic.

16. The computer system according to claim 9, the stored program instructions further comprising:
  program instructions to analyze each of the plurality of segments of the single instance of the recording for relevance, wherein each separate segment comprising silence is marked as irrelevant; and
  program instructions to, during playback of the single instance of the recoding, omit one or more segments marked as irrelevant from among the plurality of segments.

17. A computer program product comprising one or more computer-readable storage devices and program instructions, stored on at least one of the one or more storage devices, the stored program instructions comprising:
  program instructions to analyze a single instance of a recording using natural language processing to translate one or more spoken words in the single instance of the recording into textual language;
  program instructions to identify a separate complexity of each translation of each of the one or more spoken words to reflect a rate of speech at a normal playback speed and to reflect a difficulty performing natural language processing to detect each spoken word within the single instance of the recording and translate each spoken word in the single instance of the recording into textual language, each separate complexity specifying a different speed;
  program instructions to analyze the single instance of the recording to identify a plurality of segments of the recording for each separate complexity, each of the plurality of segments set to a separate length for a separate continuous portion of the one or more spoken words of a same complexity;
  program instructions to select a target rate at which to playback the single instance of the recording for access by a particular user from among a plurality of users, the target rate specifying a fastest optimal speed at which the particular user listening to the single instance of the recording is able to comprehend the playback; and
  program instructions to, during playback of the single instance of the recording, modify playback of the single instance of the recording in an interface accessible to the particular user to contiguously be at the target rate, wherein a separate adjusted playback rate is applied to each of the plurality of segments to adjust the playback rate of speech from the separate complexity of the rate of speech at the normal playback speed to the target rate.

18. The computer program product according to claim 17, the stored program instructions further comprising:
  program instructions to, during playback of the single instance of the recording, monitor through one or more interfaces selected to detect one or more types of responses by one or more users, for one or more particular responses by the particular user indicative of a comprehension level of the playback of the single instance of the recording by the particular user;
  program instructions to analyze the one or more particular responses to identify a type of response indicating the comprehension level from among a plurality of types of responses and a recommended action to change the type of response, the plurality of types of responses comprising a first response that the particular user has additional capacity for comprehension, a second response that the particular user is at an optimal capacity for comprehension, and a third response that the particular user is over capacity for comprehension; and
  program instructions, responsive to the comprehension level not evaluated as the second response that the particular user is at the optimal capacity for comprehension, dynamically adjusting, by the computer, the target rate based on the comprehension level.

19. The computer program product according to claim 18, the stored program instructions further comprising:
  program instructions, responsive to the comprehension level evaluated as additional capacity for comprehension of the playback at a faster speed, dynamically increasing, by the computer, a speed set in the target rate; and
  program instructions, responsive to the comprehension level evaluated as over capacity for comprehension of the playback at a current speed for the target rate, dynamically decreasing, by the computer, the current speed set in the target rate.

20. The computer program product according to claim 18, the stored program instructions further comprising:
  program instructions to detect a proximity of the particular user to a speaker outputting the playback of the single instance of the recording through the one or more interfaces; and
  program instructions, responsive to detecting the proximity of the particular user to the speaker within a threshold distance of the speaker, to evaluate the comprehension level of the particular user as over capacity for comprehension.

* * * * *